(12) United States Patent
Traugh

(10) Patent No.: US 11,046,372 B1
(45) Date of Patent: Jun. 29, 2021

(54) TAILGATE EXTENSION SYSTEM

(71) Applicant: William Traugh, Nelsonville, OH (US)

(72) Inventor: William Traugh, Nelsonville, OH (US)

( * ) Notice: Subject to any disclaimer, the term of this patent is extended or adjusted under 35 U.S.C. 154(b) by 0 days.

(21) Appl. No.: 17/147,570

(22) Filed: Jan. 13, 2021

Related U.S. Application Data

(60) Provisional application No. 62/971,398, filed on Feb. 7, 2020.

(51) Int. Cl.
*B62D 33/027* (2006.01)
*B60P 3/40* (2006.01)
*B62D 33/03* (2006.01)

(52) U.S. Cl.
CPC ........... *B62D 33/0273* (2013.01); *B60P 3/40* (2013.01); *B62D 33/03* (2013.01)

(58) Field of Classification Search
CPC ........ B62D 33/0273; B62D 33/03; B60P 3/40
See application file for complete search history.

(56) References Cited

U.S. PATENT DOCUMENTS

| | | | | |
|---|---|---|---|---|
| 5,732,995 A * | 3/1998 | Piccariello | ............... | B60P 1/435 |
| | | | | 296/57.1 |
| 6,364,392 B1 * | 4/2002 | Meinke | ..................... | B60P 3/40 |
| | | | | 296/26.1 |
| 6,698,810 B1 * | 3/2004 | Lane | ......................... | B60P 3/40 |
| | | | | 296/26.02 |
| 6,883,849 B2 | 4/2005 | Hebert | | |
| 6,886,877 B1 * | 5/2005 | Plavetich | ............ | B62D 33/0273 |
| | | | | 296/186.3 |
| 6,932,404 B2 * | 8/2005 | Vejnar | ................. | B62D 33/0273 |
| | | | | 296/26.09 |
| 6,957,840 B1 * | 10/2005 | Endres | ................ | B62D 33/0273 |
| | | | | 296/26.08 |
| 6,991,277 B1 * | 1/2006 | Esler | ......................... | B60P 1/435 |
| | | | | 296/26.08 |
| 7,494,169 B2 * | 2/2009 | Collins | ....................... | B60P 3/40 |
| | | | | 296/3 |
| 7,533,921 B2 * | 5/2009 | Ferrell | ....................... | B60P 3/40 |
| | | | | 296/3 |
| 7,628,439 B1 | 12/2009 | Strong | | |
| 8,608,219 B1 * | 12/2013 | Platto | ......................... | B60R 9/06 |
| | | | | 296/3 |
| 10,308,292 B1 * | 6/2019 | Shedden | ................. | B60N 3/001 |
| 2005/0093324 A1 * | 5/2005 | Bruford | .................... | B60P 3/40 |
| | | | | 296/57.1 |
| 2005/0161964 A1 | 7/2005 | Adleman | | |

(Continued)

*Primary Examiner* — Gregory A Blankenship
(74) *Attorney, Agent, or Firm* — Boudwin Intellectual Property; Daniel Boudwin

(57) ABSTRACT

A tailgate extension system is provided. The system includes a tailgate housing having a pair of channels therein. A pair of openings are disposed on an upper edge of the tailgate housing, wherein the pair of openings provide access to the pair of channels. A pair of rods are slidably disposed within the pair of channels. In some embodiments, the pair of rods each include a plurality of telescopic sections. An end bar is affixed to a distal end of each of the pair of rods, wherein the end bar is parallel to the upper edge of the tailgate housing. A slot disposed within each of the pair of rods engages a pin extending into each channel. The pair of rods selectively move between an extended position and a retracted position, wherein the retracted position, the end bar rests flush against the upper edge of the tailgate housing.

18 Claims, 6 Drawing Sheets

(56) References Cited

U.S. PATENT DOCUMENTS

| | | | |
|---|---|---|---|
| 2006/0208519 A1* | 9/2006 | King | B62D 35/007 296/57.1 |
| 2008/0309110 A1* | 12/2008 | Jones | B60P 3/40 296/57.1 |
| 2009/0072571 A1* | 3/2009 | Elliott | B62D 33/0273 296/62 |
| 2009/0273202 A1* | 11/2009 | Heaman | B62D 33/0273 296/26.1 |
| 2011/0215608 A1 | 9/2011 | Jackson | |
| 2014/0203587 A1* | 7/2014 | Krishnan | B60R 3/02 296/62 |
| 2017/0349223 A1* | 12/2017 | Spahn | B62D 33/03 |
| 2017/0361878 A1* | 12/2017 | Loew | B62D 33/0273 |
| 2019/0054961 A1* | 2/2019 | Ngo | B60R 3/00 |
| 2019/0389388 A1* | 12/2019 | Ngo | B60R 3/02 |
| 2020/0070898 A1* | 3/2020 | Salvia, III | B62D 33/08 |

* cited by examiner

TAILGATE EXTENSION SYSTEM

CROSS REFERENCE TO RELATED APPLICATIONS

This application claims the benefit of U.S. Provisional Application No. 62/971,398 filed on Feb. 7, 2020. The above identified patent application is herein incorporated by reference in its entirety to provide continuity of disclosure.

BACKGROUND OF THE INVENTION

The present invention relates to tailgate extensions. More particularly, the present invention pertains to a tailgate extension system wherein a truck bed can be functionally extended to a desired length via integrated extendable support rods which are secured within the tailgate via an interlocking pin and slot arrangement.

Many individuals purchase pickup trucks to assist in transporting objects in either large quantities or large volume. However, the beds of pickup trucks are limited by the size of the vehicle, and often only extend up to six feet. In order to transport larger objects, users must either lower the tailgate and tie objects to the truck bed, or otherwise rent or purchase a larger transport, such as a moving truck or van. Each of these solutions, however, presents an undesirable effect. For example, objects secured to the opened truck bed may fall from the truck bed during transport if not properly secured, which can result in roadway safety issues, potentially leading to injury or damage to the surrounding area or other vehicles. Alternatively, renting or purchasing additional vehicles to transport larger objects can be a financial drain. Additionally, these larger vehicles may be difficult to operate, which in turn may result in similar roadway safety concerns. Therefore, a system for extending the length of a standard pickup truck bed is desired.

In light of the devices disclosed in the known art, it is submitted that the present invention substantially diverges in design elements from the known art and consequently it is clear that there is a need in the art for an improvement to existing tailgate extensions. In this regard, the instant invention substantially fulfills these needs.

SUMMARY OF THE INVENTION

In view of the foregoing disadvantages inherent in the known types of tailgate extensions now present in the known art, the present invention provides a tailgate extension system wherein the same can be utilized for providing convenience for the user when increasing the functional length of a truck bed to support large articles thereon.

The present system comprises a tailgate housing having a pair of channels therein. A pair of openings is disposed on an upper edge of the tailgate housing, wherein the pair of openings provide access to the pair of channels. A pair of rods are slidably disposed within the pair of channels. In some embodiments, the pair of rods each comprise a plurality of telescopic sections. An end bar is affixed to a distal end of each of the pair of rods, wherein the end bar is parallel to the upper edge of the tailgate housing. A slot is disposed within each of the pair of rods, wherein the slot is configured to engage a pin extending into each channel. The pair of rods are configured to selectively move between an extended position and a retracted position, wherein the retracted position, the end bar rests flush against the upper edge of the tailgate housing.

In some embodiments, the end bar comprises a curved shape configured to conform to the upper end of the tailgate housing. In another embodiment, the pin is disposed adjacent to each opening. In other embodiments, the slot extends longitudinally along each rod of the pair of rods. In embodiments having a plurality of telescopic sections, the slot is disposed longitudinally along a first telescopic section of the plurality of telescopic sections. In yet another embodiment, the slot comprises a pair of closed ends, such that the pin prevents extension and retraction of the pair of rods beyond a desired length. In some embodiments, a platform is removably securable to the pair of rods, wherein an upper surface of the platform is coplanar with an interior surface of the tailgate housing. In another embodiment, the platform further comprises a pair of legs on opposing lateral sides of the platform, the pair of legs configured to prevent lateral movement of the platform when secured to the pair of rods. In other embodiments, an interior surface of the tailgate housing comprises a textured surface. In yet another embodiment, a linear distance between the end bar and the upper end is equivalent to a height of the tailgate housing when in the extended position. In embodiments having a plurality of telescopic sections, a linear distance between the end bar and the upper end is greater than a height of the tailgate housing when in the extended position. In other embodiments having a plurality of telescopic sections, each subsequent telescopic section comprises a longitudinal slot therein configured to engage a section pin extending inwardly from a previous telescopic section.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
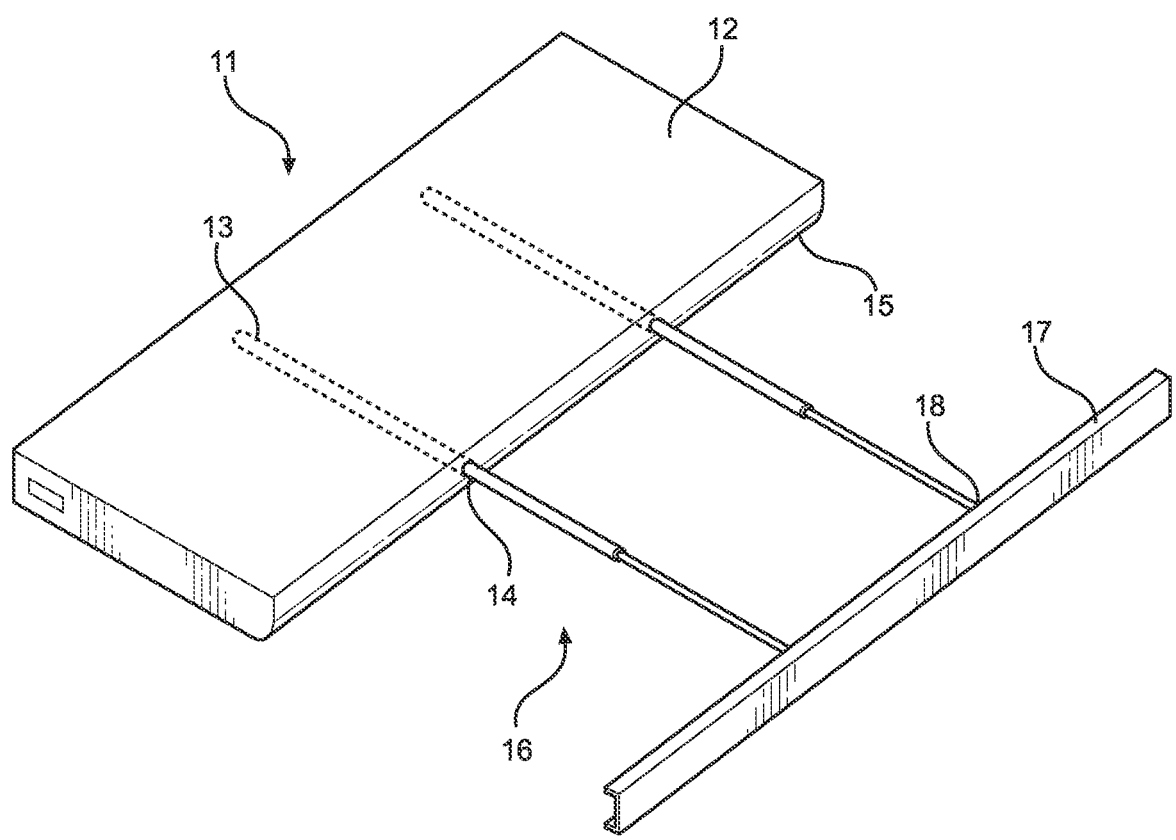
FIG. 1 shows a perspective view of an embodiment of the tailgate extension system.

Reference is made herein to the attached drawings. Like reference numerals are used throughout the drawings to depict like or similar elements of the tailgate extension system. For the purposes of brevity, the following disclosure refers to embodiments using a pair of channels, a pair of rods, a pair of openings, and the like. However, it should be understood that throughout, wherever "a pair" appears, other embodiments having greater numbers of elements are similarly contemplated, such that "a pair" may also be read to include "two or more." The figures are intended for representative purposes only and should not be considered to be limiting in any respect.

Referring now to FIG. 1, there is shown a perspective view of an embodiment of the tailgate extension system. The tailgate extension system 11 comprises a tailgate housing 12 having a pair of channels 13 therein. A pair of openings 14 are disposed in an upper edge of the tailgate housing 12, wherein the pair of openings 14 provide access to the pair of channels 13. A pair of rods 16 are slidably disposed within the pair of channels 13, wherein the pair of rods 16 are selectively moveable between an extended position and a retracted position, wherein the retracted position, the pair of rods 16 are disposed entirely within the pair of channels 13. The pair of rods 16 are contemplated to comprise a variety of diameters as required to increase the structural integrity of and support provided by the pair of rods 16. As such, the maximum diameter of the pair of rods 16 are contemplated to bounded only by the relative size of the tailgate housing 12. An end bar 17 is affixed to a distal end 18 of each of the pair of rods 16, such that the end bar 17 is parallel to the upper edge 15. The tailgate housing 12 can be pivotally secured to an existing vehicle bed, allowing the user to replace a typical tailgate on a vehicle with the tailgate extension system 11. In this manner, the user can extend the pair of rods 16 to support elongated objects on a combination of the vehicle bed and the tailgate extension system 11. In various embodiments, the tailgate housing 12 can be installed in an existing vehicle or incorporated into future vehicle models.

Figure 2A:
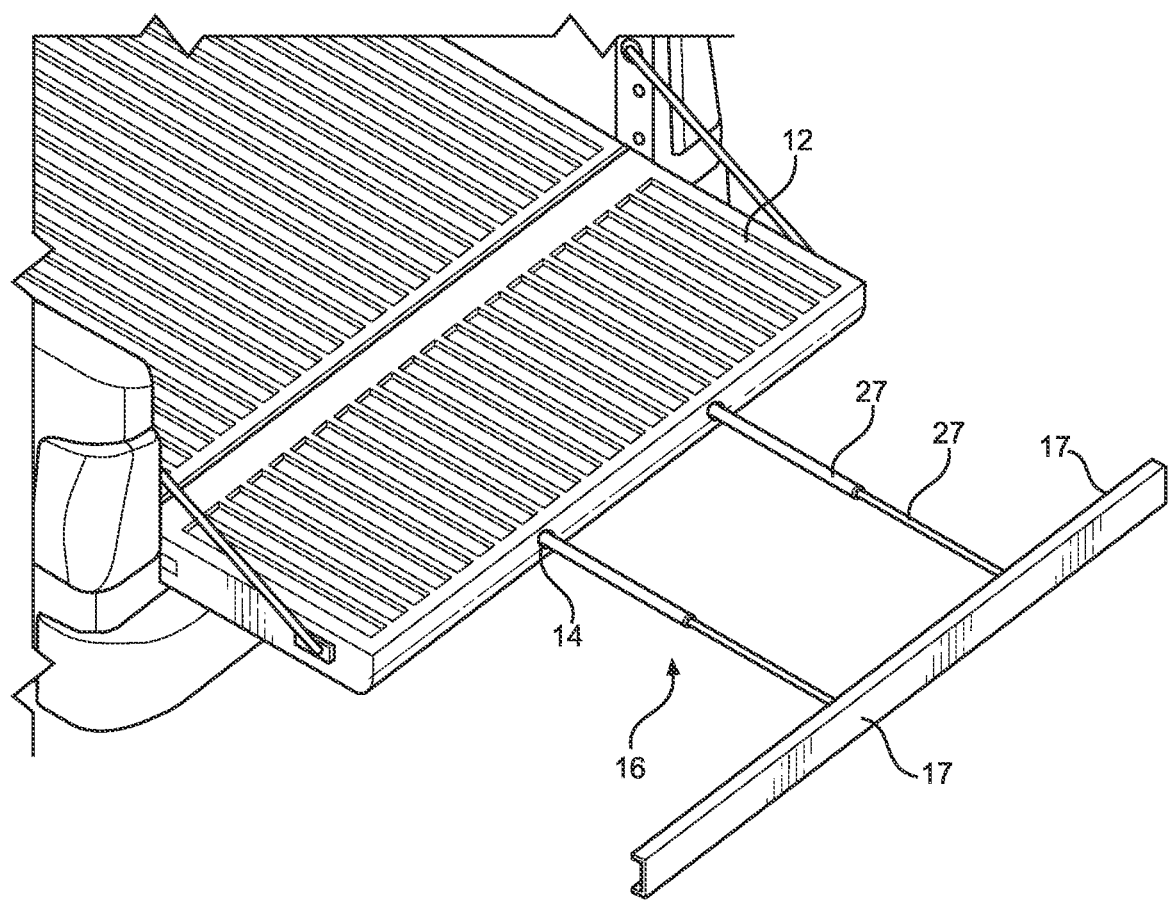
FIG. 2A shows a perspective view of an embodiment of the tailgate extension system in an extended position.
Figure 2B:
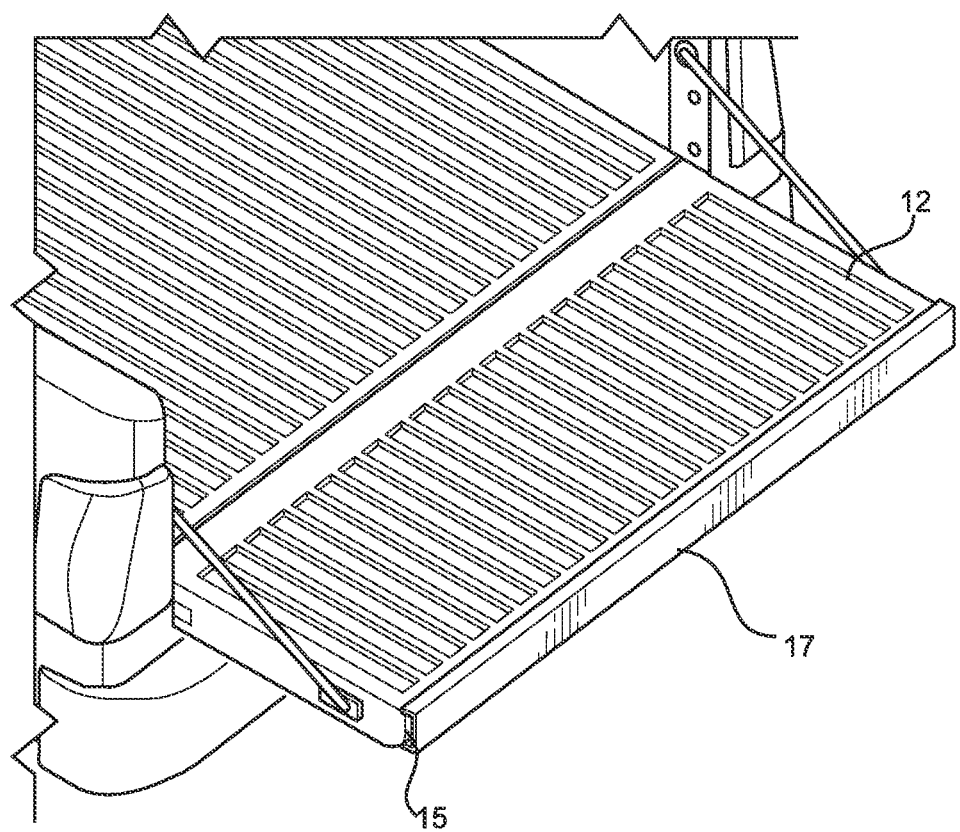
FIG. 2B shows a perspective view of an embodiment of the tailgate extension system in a retracted position.

Referring now to FIGS. 2A and 2B, there is shown a perspective view of an embodiment of the tailgate extension system in an extended position and a perspective view of an embodiment of the tailgate extension system in a retracted position, respectively. In the shown embodiments, the pair of rods 16 are slidably movable between an extended position (as shown in FIG. 2A) and a retracted position (as shown in FIG. 2B). In the illustrated embodiments, the pair of rods 16 comprise a plurality of telescopic sections 27, such that the pair of rods 16 are telescopically extendable such that a linear distance between the end bar 17 and upper edge 15 is greater than a height of the tailgate housing 12. In the shown embodiment, the pair of rods 16 comprise a pair of telescopic sections 27, however, in alternate embodiments additional telescopic sections 27 are contemplated to increase the distance to which the tailgate extension system can be extended. In this manner, the tailgate extension system can support items of greater length. In embodiments wherein the pair of rods 16 comprise a solid rod, the pair of rods 16 are extendable such that a linear distance between the end bar 17 and the upper edge 15 of the tailgate housing 12 is equivalent to the height of the tailgate housing 12. In such embodiments, the solid construction of the pair of rods 16 provide additional structural stability to the tailgate extension system.

In the illustrated embodiment, the end bar 17 rests flush against the upper edge 15 when the tailgate extension system is in the retracted position. In this way, the end bar 17 encloses the pair of openings 14, such that dirt and debris cannot enter the pair of channels. In the illustrated embodiment, the end bar 17 comprises a cross-sectional shape configured to conform to the shape of the upper edge 15 of the tailgate housing 12. In this way, the end bar 17 can frictionally engage the upper edge 15 to secure the tailgate extension system in the retracted position. In some embodiments, the end bar 17 is curved, whereas, in other embodiments, the end bar 17 comprises a C-shaped cross-section.

Figure 3A:
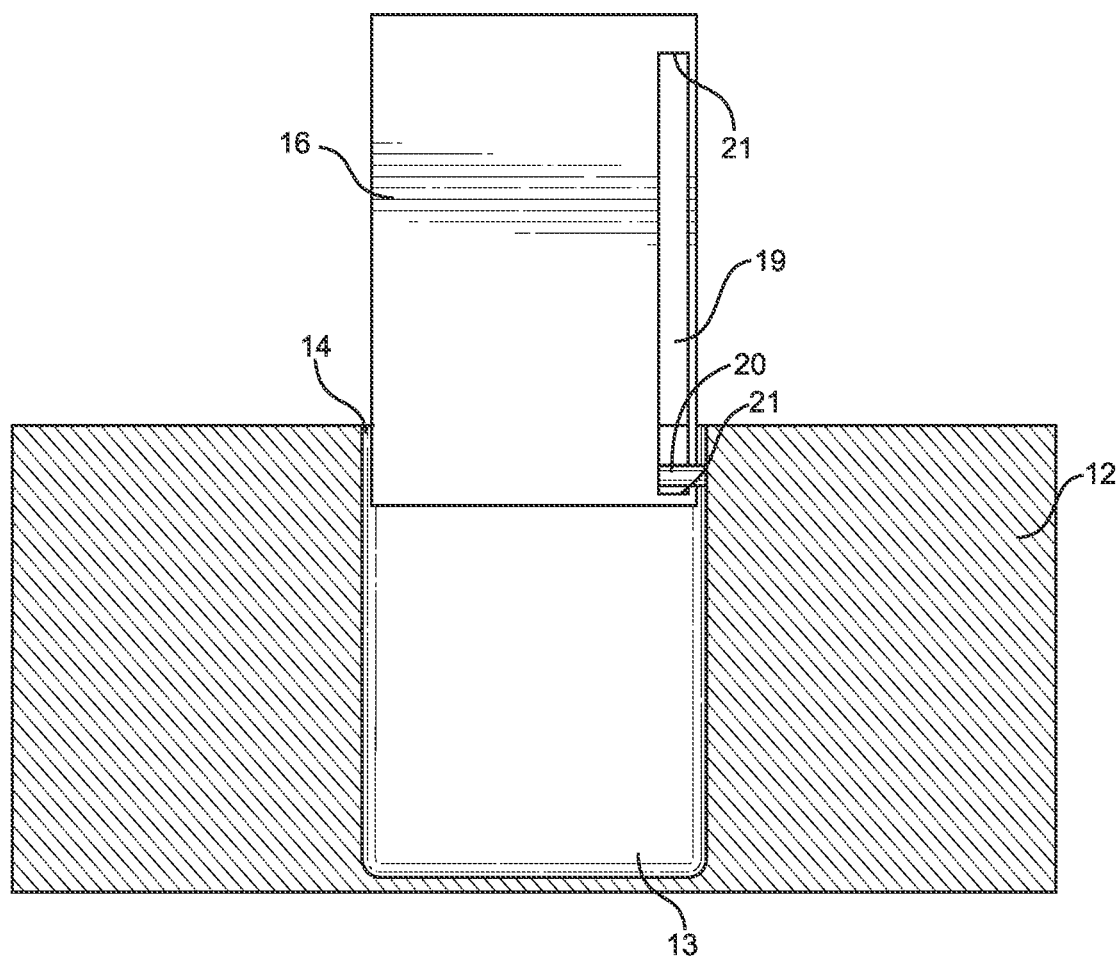
FIG. 3A shows a cross-sectional view of the rod and channel of an embodiment of the tailgate extension system.
Figure 3B:
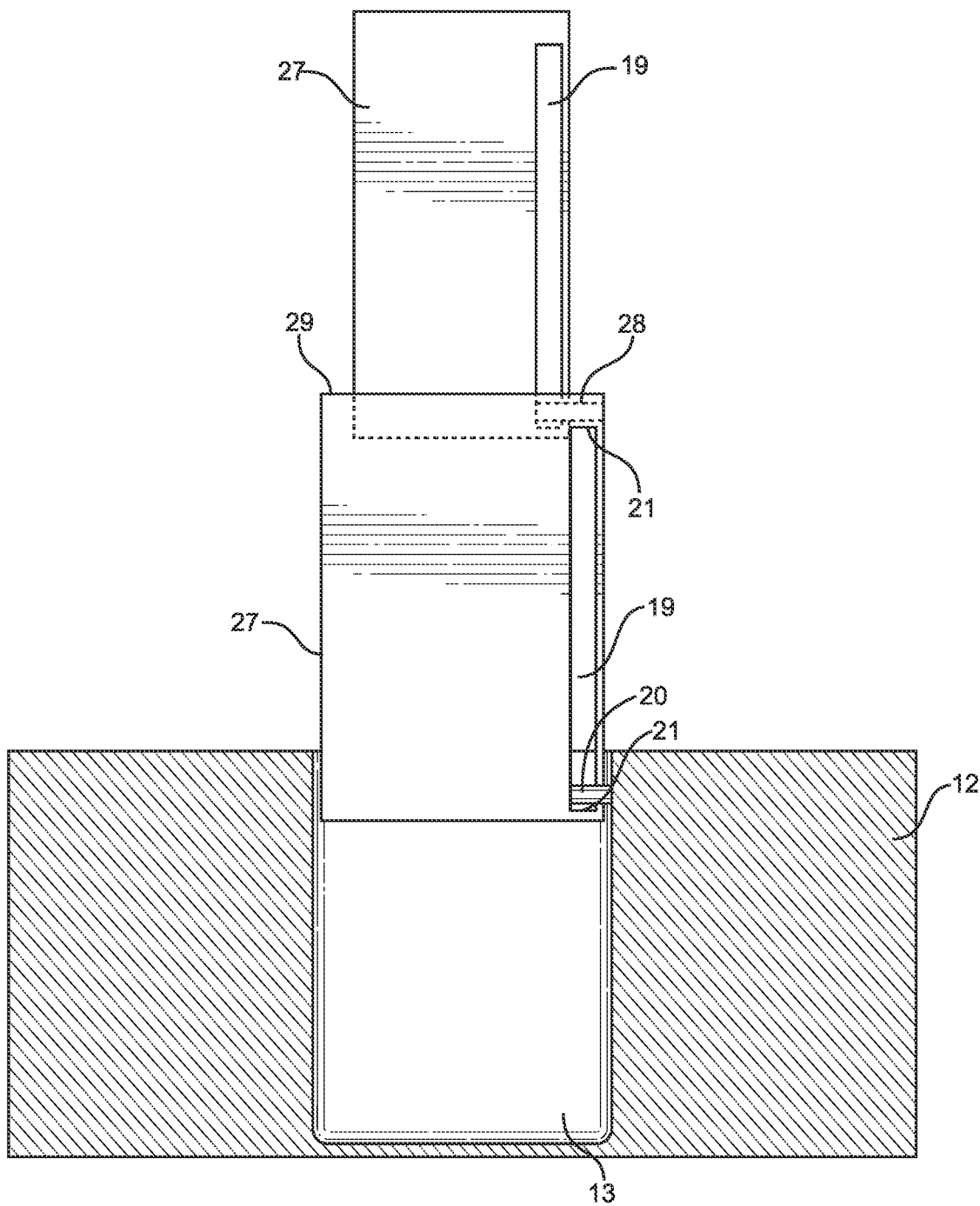
FIG. 3B shows a cross-sectional view of the rod and channel of an alternate embodiment of the tailgate extension system.

Referring now to FIGS. 3A and 3B, there is shown a cross-sectional view of the rod and channel of an embodiment of the tailgate extension system and a cross-sectional view of the rod and channel of an alternate embodiment of the tailgate extension system, respectively. In the illustrated embodiment of FIG. 3A, a slot 19 is disposed longitudinally along each rod of the pair of rods 16. The slot 19 is configured to engage a pin 20 extending from an interior sidewall of each channel of the pair of channels 13. In the shown embodiment, the slot 19 comprises a pair of closed ends 21, thereby limiting the degree of extension of the pair of rods 16. In this manner, the pair of rods 16 are prevented from fully exiting the tailgate housing 12, thereby ensuring that the tailgate extension system remains assembled. In the shown embodiment, the pin 20 is disposed adjacent to each of the pair of openings 14, such that the pin 20 serves as a stopper for the pair of rods 16.

Similarly, in the illustrated embodiment of FIG. 3B, the telescopic embodiment of the pair of rods 16 includes a slot 19 in each telescopic section 27 of the pair of rods 16. In the shown embodiment, the pin 20 extends into the slot 19 of a first telescopic section 27, and a section pin 28 extends into an interior of the first telescopic section 27 at a far end 29 thereof to engage a slot 19 disposed within a subsequent telescopic section 27. In this manner, the section pin 28 prevents the telescopic section 27 from being fully removed from the previous telescopic section 27. In the shown embodiment, a pair of telescopic sections 27 are shown, however, in alternate embodiments, additional telescopic sections 27 utilizing a similar section pin 28 and slot 19 arrangement are contemplated. While the foregoing discussion focuses on the slot 19 and pin 20 arrangement, alternate methods of retaining the pair of rods 16 within the pair of channels 13 are contemplated.

Figure 4:
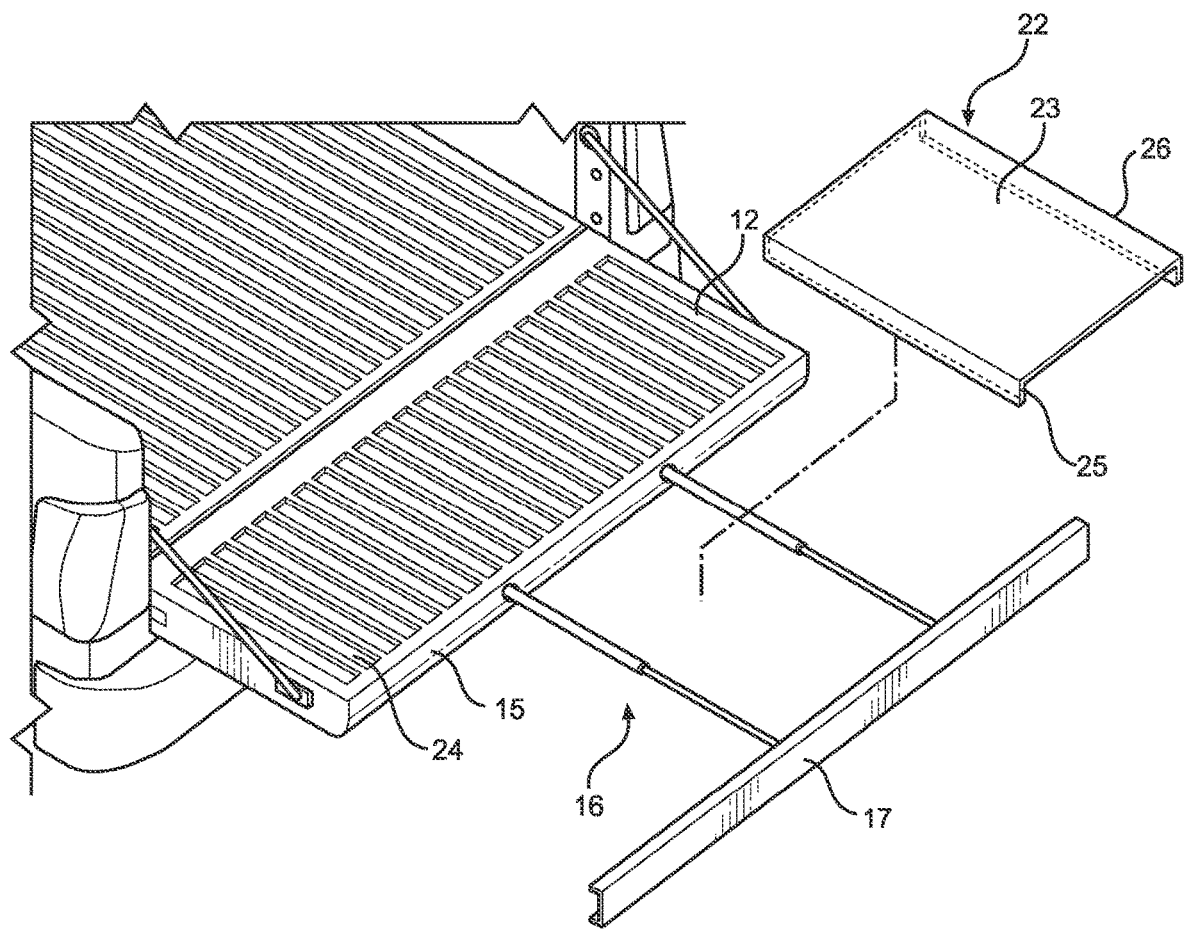
FIG. 4 shows an exploded view of the platform of an embodiment of the tailgate extension system.

Referring now to FIG. 4, there is shown an exploded view of the platform of an embodiment of the tailgate extension system. In the illustrated embodiment, the tailgate extension system further comprises a platform 22 removably securable to the pair of rods 16, such that the platform 22 provides additional surface area upon which to rest elongated objects. In some such embodiments, an upper surface 23 of the platform 22 is configured to rest coplanar with an interior surface 24 of the tailgate housing 12 when the platform 22 is secured to the pair of rods 16. In the illustrated embodiment, the interior surface 24 comprises a textured surface thereon to better frictionally engage elongated objects placed thereon. In some such embodiments, the textured surface further extends across the upper surface 23 of the platform 22 to increase frictional engagement with the platform 22. In the illustrated embodiment, a pair of legs 25 extend orthogonally from opposing lateral sides 26 of the platform 22, wherein the pair of legs 25 are dimensioned to secure about the pair of rods 16 to prevent lateral shifting of the platform 22 during use. A length of the platform 22 is contemplated to match a distance between the upper edge 15 and the end bar 17 when the tailgate extension system is in the extended position.

In one use, when the user wishes to transport an elongated object in a pickup truck bed, the user can first lower the tailgate housing 12 to a lowered position. The user can then extend the pair of rods 16 to the extended position, such that the elongated object rests against the truck bed, the interior surface 24 of the tailgate housing 12, and the end bar 17. In some embodiments, the user can further affix the platform 22 to the pair of rods 16 to increase support provided to the elongated object, while simultaneously increasing frictional engagement therewith, thereby preventing the elongated object from shifting excessively during transport. In some uses, the user can further tie down the elongated object to the truck bed, or about the end bar 17 to prevent movement of the elongated object during transport. Once the elongated object has been moved to a desired location, the user can retract the pair of rods 16 into the tailgate housing 12, such that the end bar 17 frictionally engages the upper edge 15 of the tailgate housing 12, such that the tailgate extension system is retained in the retracted position. In this way, the user can efficiently transport elongated objects with a typically sized pickup truck bed.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A tailgate extension system, comprising:
   a tailgate housing having two or more channels therein;
   two or more openings disposed on an upper edge of the tailgate housing, the openings providing access to the channels;
   two or more rods slidably disposed within the channels;
   an end bar affixed to a distal end of each of the rods, wherein the end bar is parallel to the upper edge of the tailgate housing;
   a platform removably securable to the pair of rods, wherein an upper surface of the platform is coplanar with an interior surface of the tailgate housing;
   wherein the rods are configured to selectively move between an extended position and a retracted position; and
   wherein the retracted position, the end bar rests flush against the upper edge of the tailgate housing.

2. The tailgate extension system of claim 1, wherein the end bar comprises a curved shape configured to conform to the upper edge of the tailgate housing.

3. The tailgate extension system of claim 1, wherein a slot is disposed within each of the rods, the slot configured to engage a pin extending into each channel.

4. The tailgate extension system of claim 3, wherein the pin is disposed adjacent to each opening.

5. The tailgate extension system of claim 3, wherein the slot extends longitudinally along each rod.

6. The tailgate extension system of claim 3, wherein the slot comprises a pair of closed ends, such that the pin prevents extension and retraction of the rods beyond a desired length.

7. The tailgate extension system of claim 1, wherein the platform further comprises a pair of legs on opposing lateral sides thereof, the pair of legs configured to prevent lateral movement of the platform when secured to the rods.

8. The tailgate extension system of claim 1, wherein the extended position, a linear distance between the end bar and the upper edge is equivalent to a height of the tailgate housing.

9. A tailgate extension system, comprising:
   a tailgate housing having two or more channels therein;
   two or more openings disposed on an upper edge of the tailgate housing, the openings providing access to the channels;
   two or more rods slidably disposed within the channels;
   wherein each rod comprises a plurality of telescopic sections;
   an end bar affixed to a distal end of each of the rods, wherein the end bar is parallel to the upper edge of the tailgate housing;
   a platform removably securable to the pair of rods, wherein an upper surface of the platform is coplanar with an interior surface of the tailgate housing;
   wherein the rods are configured to selectively move between an extended position and a retracted position; and
   wherein the retracted position, the end bar rests flush against the upper edge of the tailgate housing.

10. The tailgate extension system of claim 9, wherein the end bar comprises a curved shape configured to conform to the upper edge of the tailgate housing.

11. The tailgate extension system of claim 9, wherein a slot is disposed within a first telescopic section of each of the rods, the slot configured to engage a pin extending into each channel.

12. The tailgate extension system of claim 11, wherein the pin is disposed adjacent to each opening.

13. The tailgate extension system of claim 12, wherein the slot extends longitudinally along each first telescopic section.

14. The tailgate extension system of claim 12, wherein the slot comprises a pair of closed ends, such that the pin prevents extension and retraction of the rods beyond a desired length.

15. The tailgate extension system of claim 9, wherein each subsequent telescopic section comprises a longitudinal slot therein configured to engage a section pin extending inwardly from a previous telescopic section.

16. The tailgate extension system of claim 15, wherein the section pin is disposed on a far end of each telescopic section.

17. The tailgate extension system of claim 9, wherein the platform further comprises a pair of legs on opposing lateral sides thereof, the pair of legs configured to prevent lateral movement of the platform when secured to the rods.

18. The tailgate extension system of claim 9, wherein the extended position, a linear distance between the end bar and the upper edge is greater than a height of the tailgate housing.

* * * * *